UNITED STATES PATENT OFFICE.

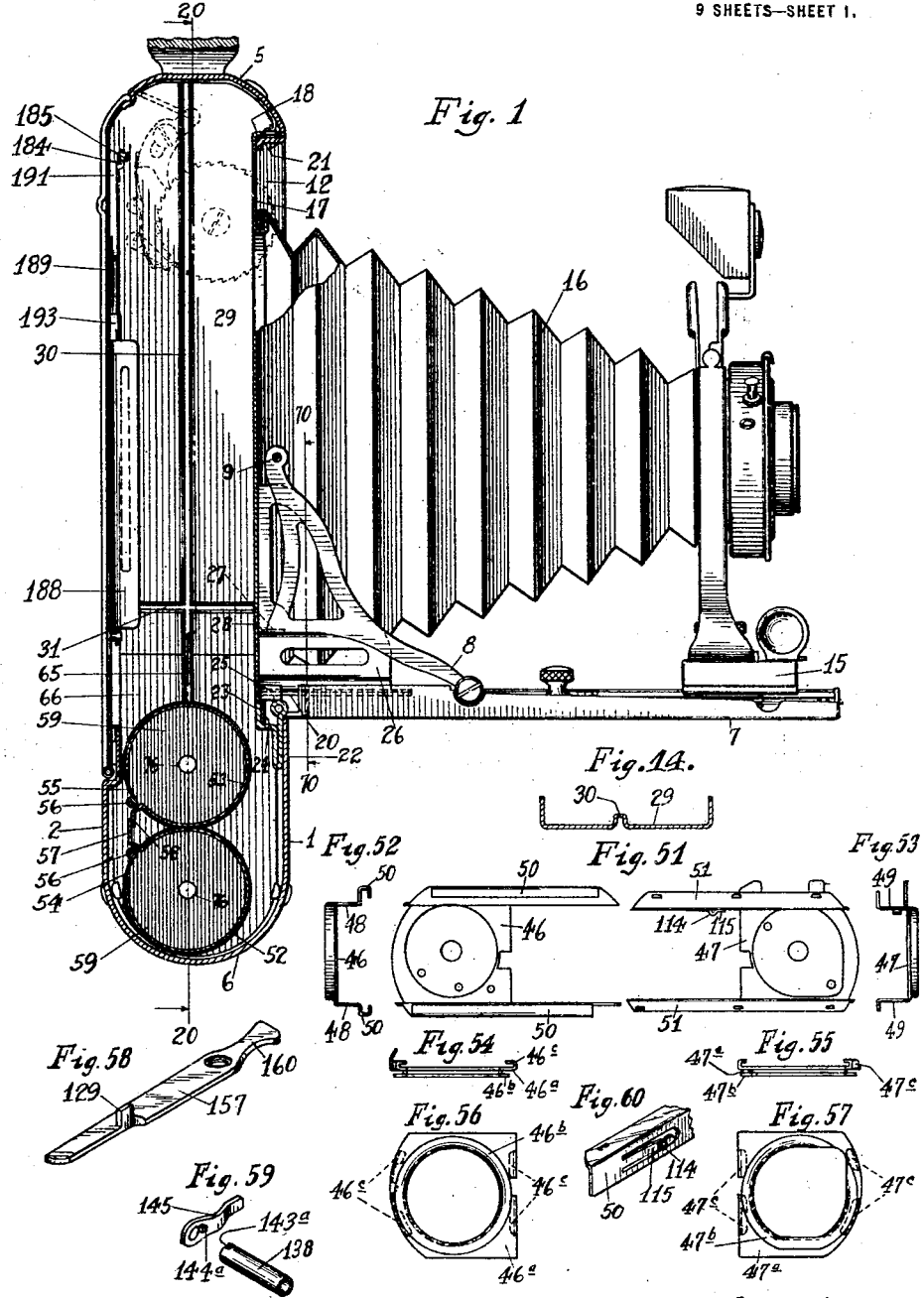

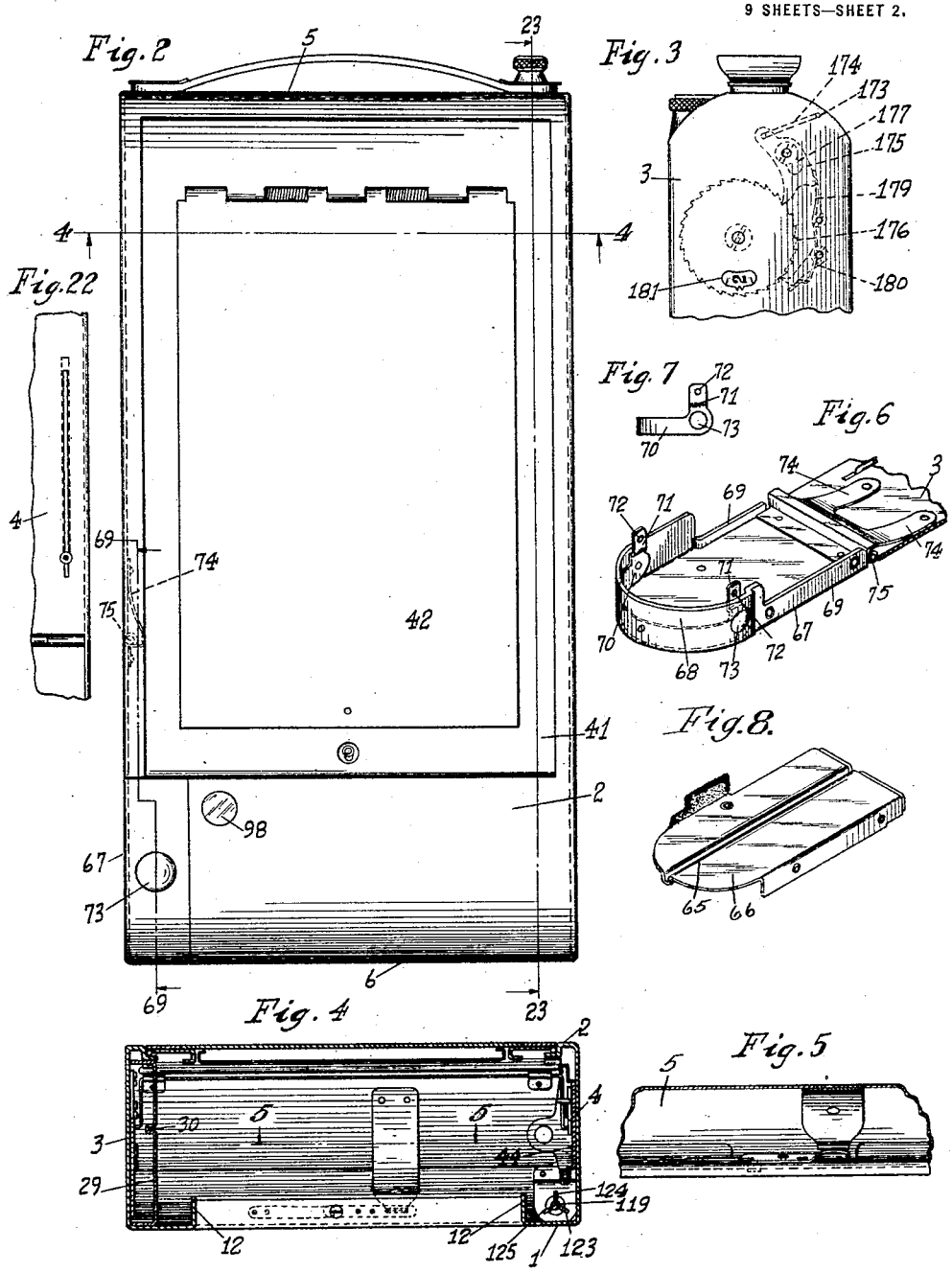

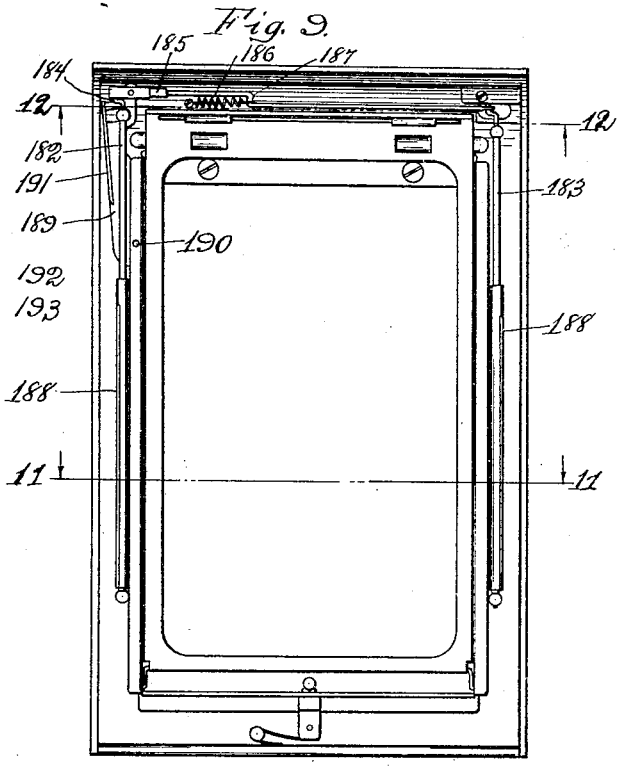
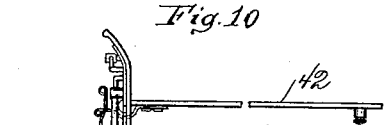
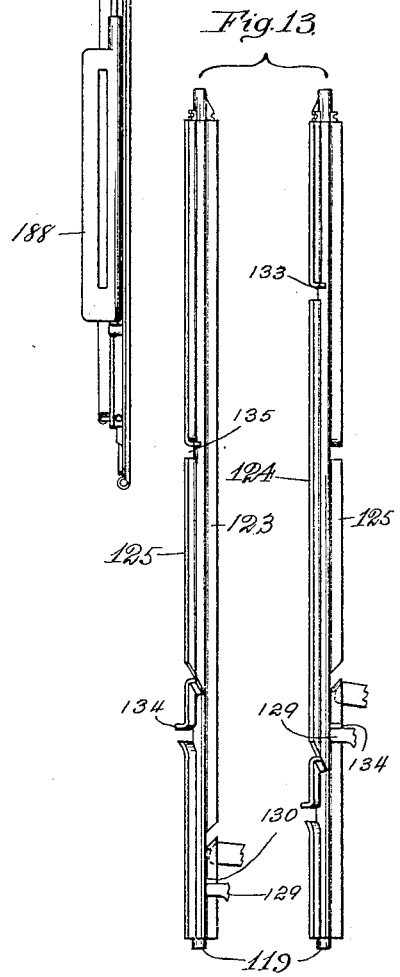
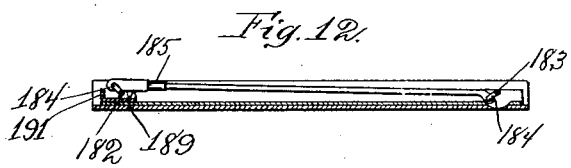

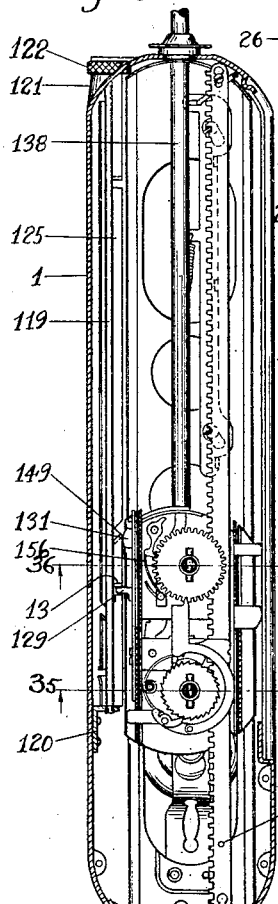
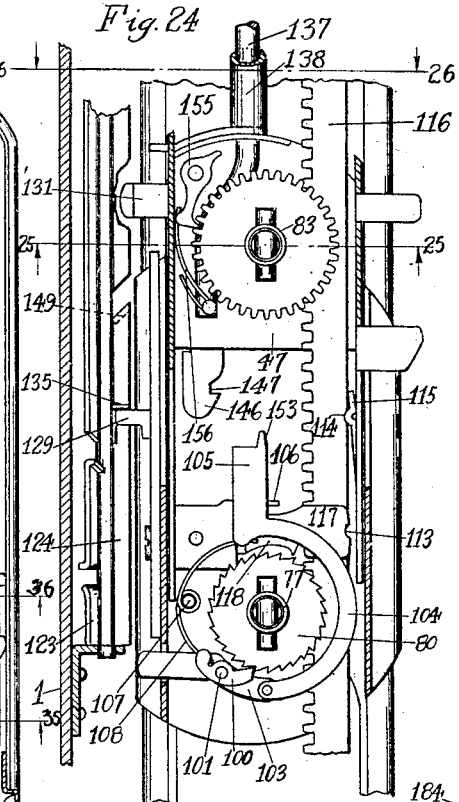
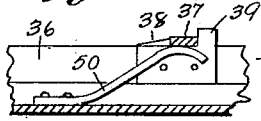
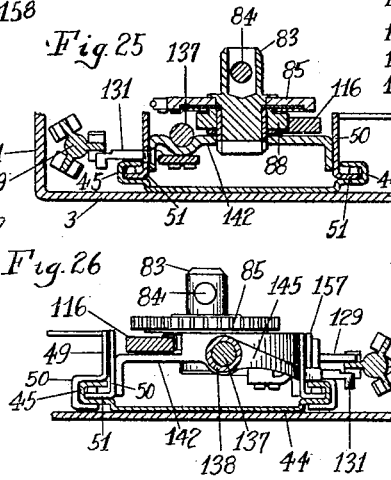
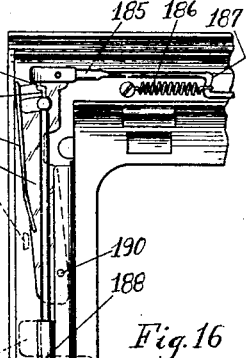
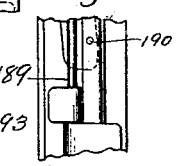

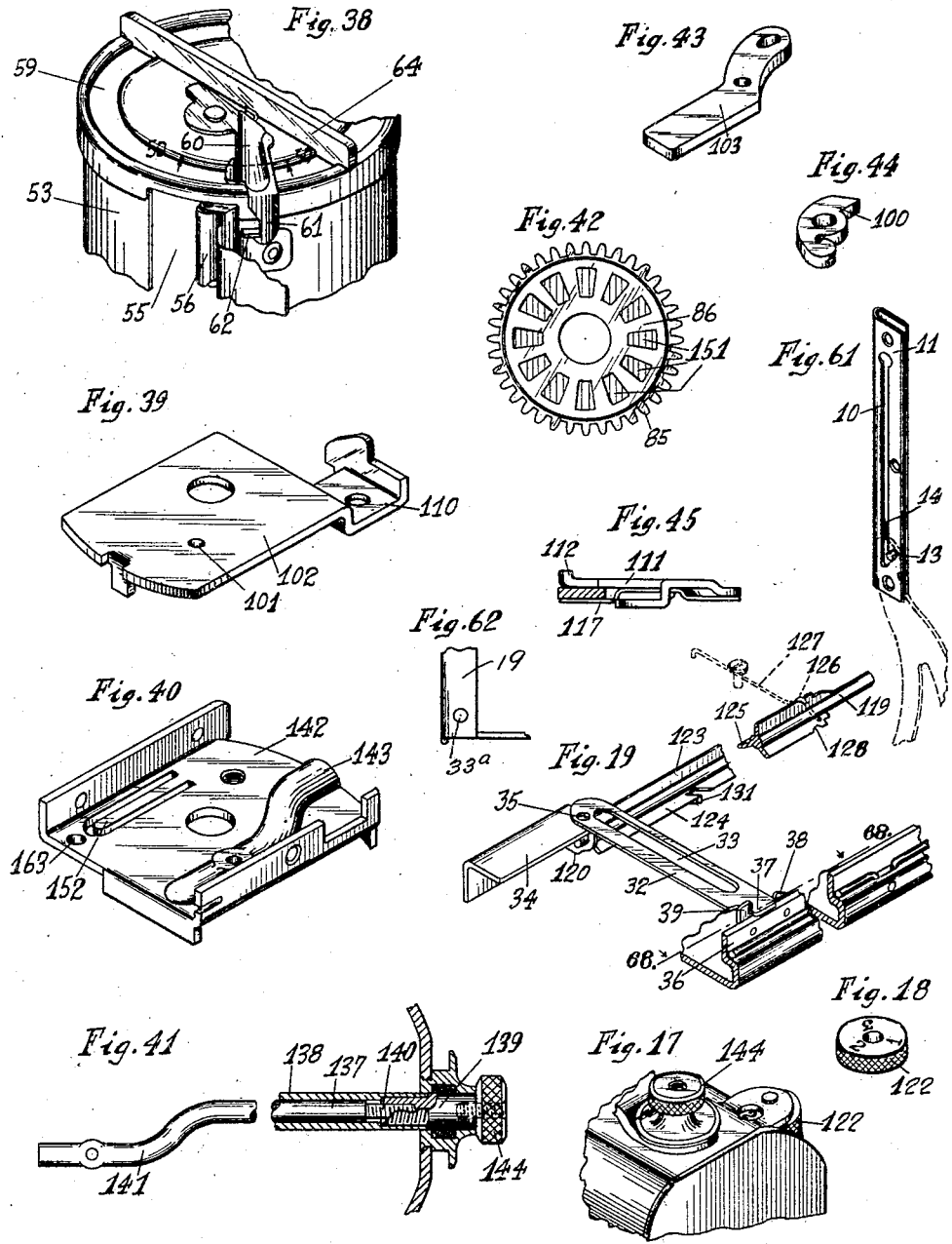

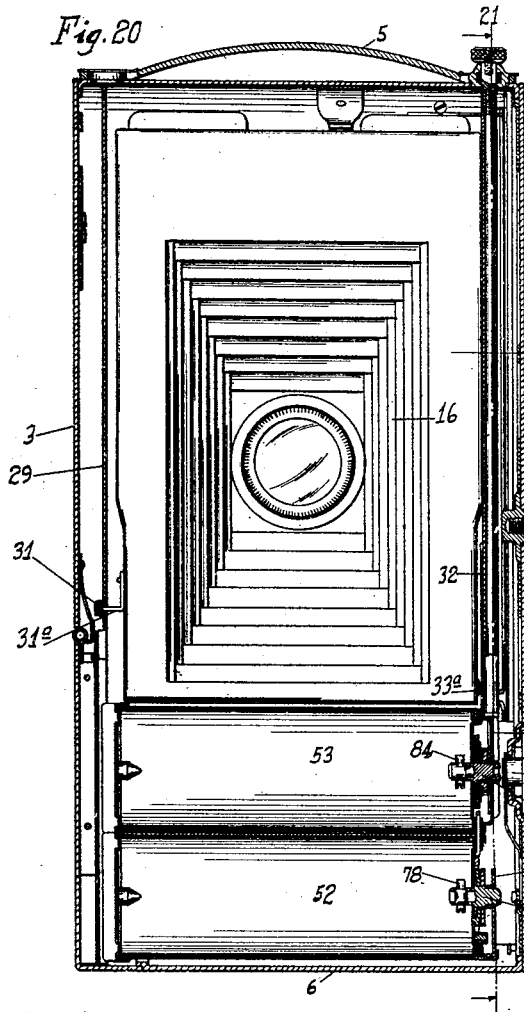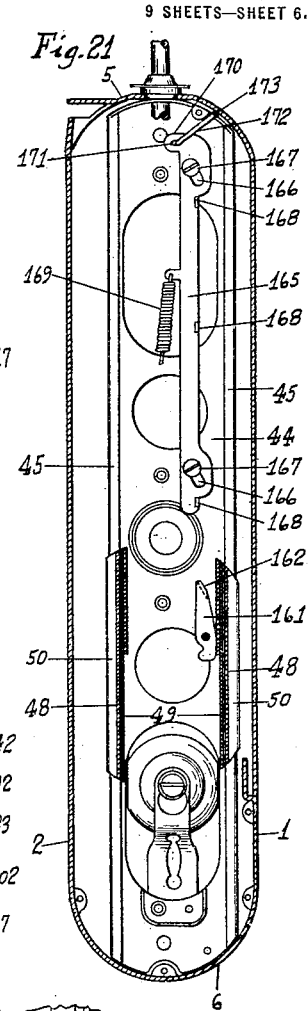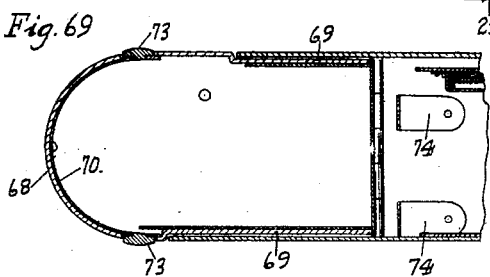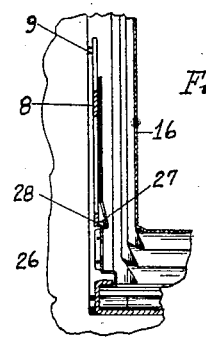

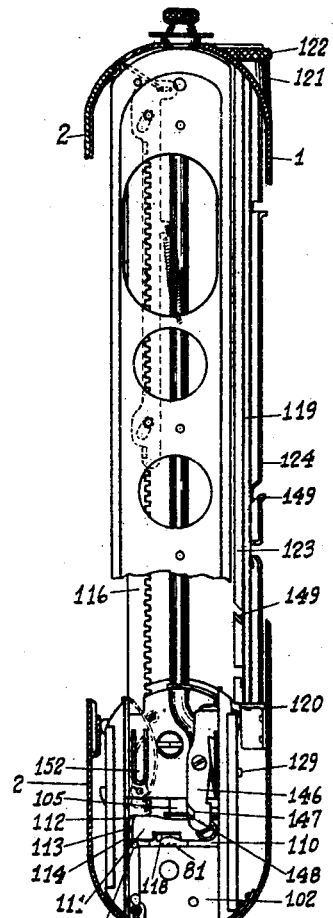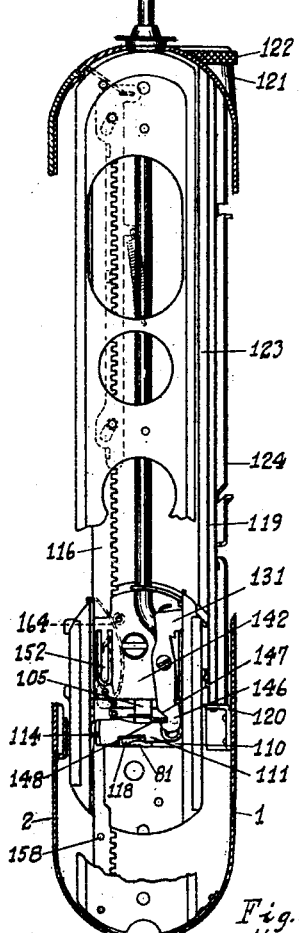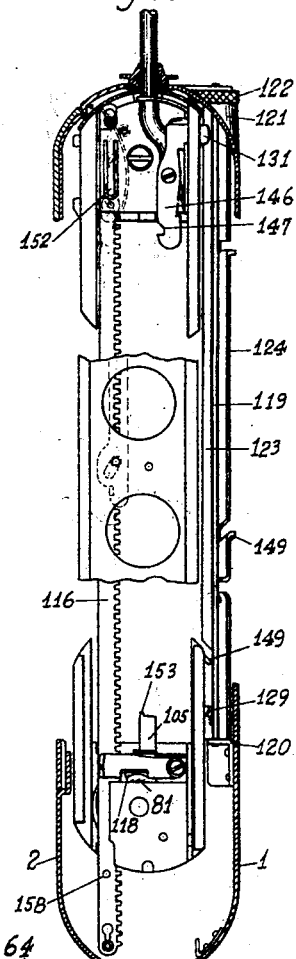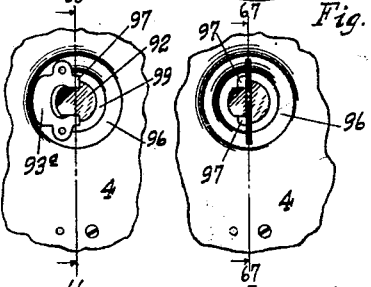

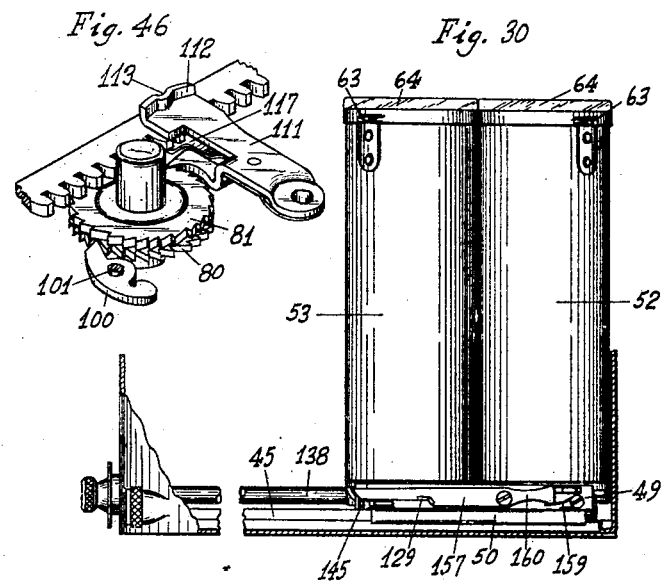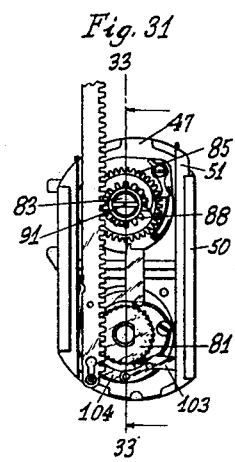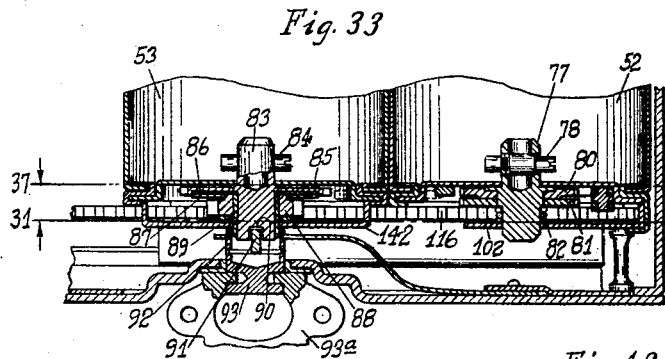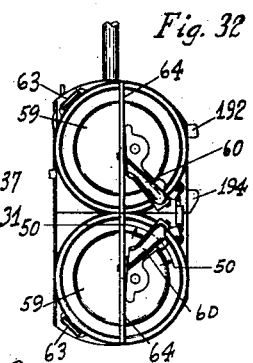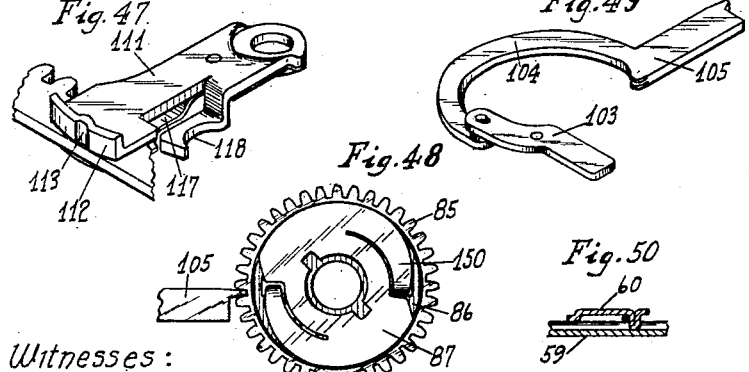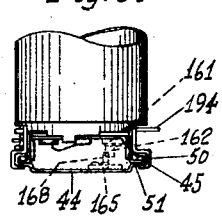

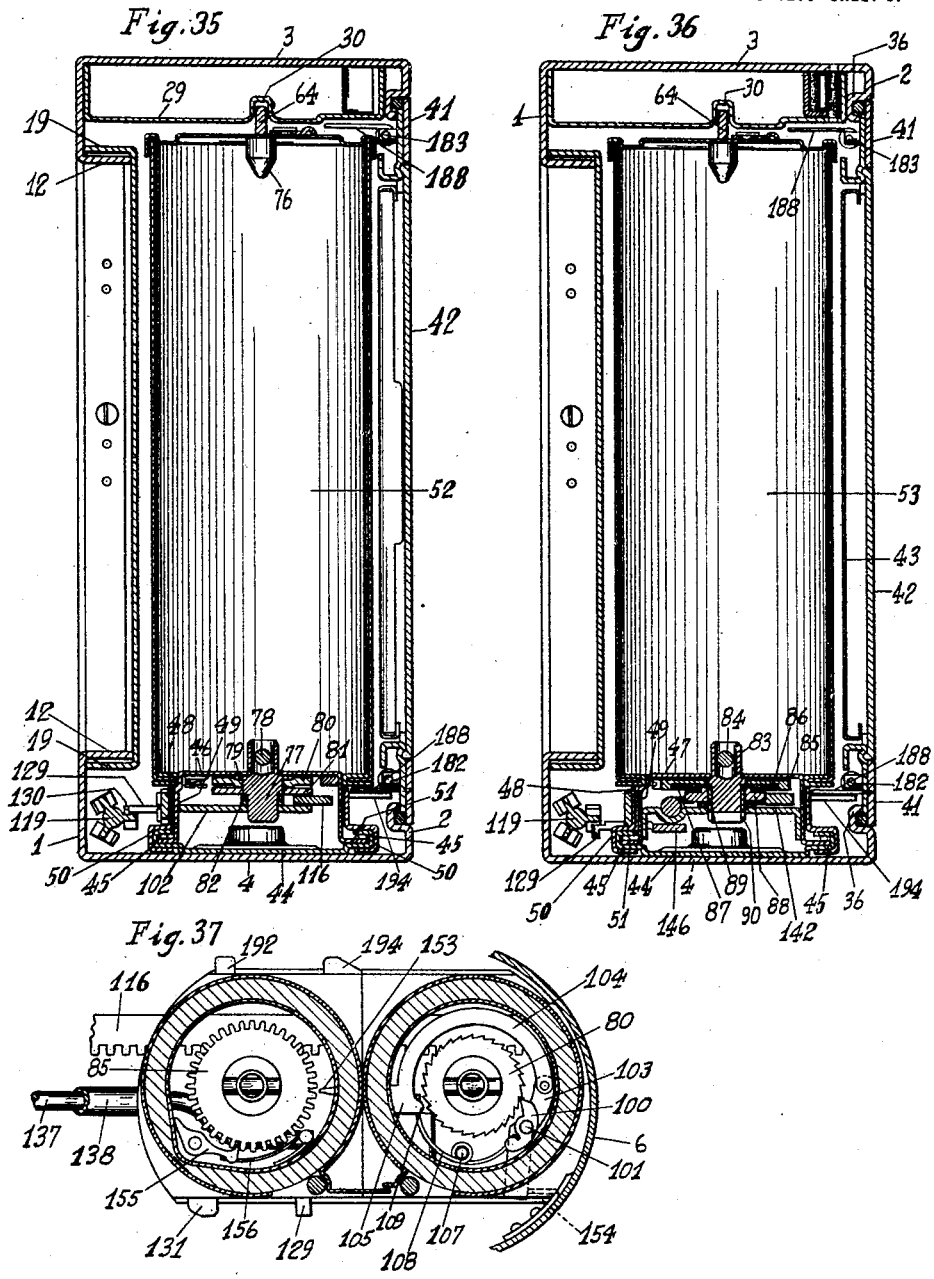

WILLIAM A. PETERS, OF CHICAGO, ILLINOIS, ASSIGNOR TO INTERNATIONAL PATENT LICENSING CORPORATION, OF CHICAGO, ILLINOIS, A CORPORATON OF DELAWARE.

PHOTOGRAPHIC CAMERA.

1,395,293.  Specification of Letters Patent.  Patented Nov. 1, 1921.

Substitute for application Serial No. 56,227, filed October 16, 1915. This application filed October 13, 1919. Serial No. 330,681.

*To all whom it may concern:*

Be it known that I, WILLIAM A. PETERS, a citizen of the United States, residing at Chicago, in the county of Cook and State of Illinois, have invented certain new and useful Improvements in Photographic Cameras; and I do hereby declare the following to be a full, clear, and exact description of the invention, such as will enable others skilled in the art to which it appertains to make and use the same.

This present application is directed to the same subject-matter as presented in my earlier application, filed October 16th, 1915, Serial No. 56,227.

This invention relates to improvements in photographic cameras and particularly to that kind or type which are known as folding pocket cameras, or in other words, a bellows camera adapted to fold into a small space to adapt the same to be carried in the pocket or suspended from shoulder straps.

The particular objects of the present invention are as follows:

First: To provide a camera of this character in which the film roll is adapted to be used, and in which the roll carrier or carriers are adapted to be moved to various predetermined positions within the camera body for the purpose of exposing either large or small areas thereof in the exposure plane for the purpose of taking pictures.

Second: To provide a film camera as set forth in which the film carrying mechanism or elements are normally disposed out of the path of the rays of light entering through the lens of the camera and wherein the back of the camera is provided with a ground glass, or the like, enabling the camera to be properly focused prior to exposing the film for the purpose of taking a picture.

Third: To provide a camera of the character defined in which the film to be exposed may be very rapidly brought into the focal plane and exposed for the taking of one or a plurality of pictures.

Fourth: To provide a camera of the character defined in which the film roll carrying devices are relatively so arranged and constructed as to adapt the same to the use of film protected by a relatively short length of opaque paper in place of the long strips now employed, and in which the short strips or lengths need be attached only to the ends of the film strip for protection of the same against exposure to light previous to and during loading of the camera and previous to and after unloading the same.

Fifth: To provide in a camera of the character defined means associated with the film carrying and manipulating mechanism whereby the total length of film exposed is automatically recorded and in which the amount of film consumed in proportion to the number of pictures of normal or maximum size taken is less than in the film cameras at present in use.

Sixth: To provide film carrying and manipulating mechanism so constructed and arranged as to render substantially impossible the exposure of the same film area twice to the light.

Seventh: To provide in a camera of the character defined film carrying and manipulating mechanism so constructed and arranged as to permit of the opening of the camera body at any time that said film carrying means are disposed in normal position to admit light to said body without permitting such light to penetrate to said film.

Eighth: To provide in a camera of the character defined mechanism for primarily winding a given length of film or paper attached to the end of the film strip from the roll after loading the film spool into its carrier and in which such winding mechanism becomes inoperative to unwind film from the roll as soon as the film roll carrier is moved from its normal position and in which said winding mechanism is manually thrown out of engaging relation to the film take-up roll or spool by the return of the winding key to its recess and is so held during the operation of the camera.

Ninth: To provide a camera of the character defined in which the operator may continue his gaze into the finder or watch the object being photographed while manipulating the film for the purpose of making the successive exposures.

Tenth: To provide a camera of the character defined in which it will be impossible to expose film to light rays until the bellows of the camera has been moved forward to a predetermined position preparatory to making an exposure.

Eleventh: To provide a folding film camera of the character defined which cannot be closed so long as any portion of the film is in exposure position.

Twelfth: To provide a camera of the character set forth in which the camera bed cannot be turned to closed position relatively to the housing until the lens-board carriage and bellows support have been moved to the rearward limits of their movement.

Thirteenth: A further object of the present invention is to provide means for preventing closure of the camera bed until the lens-board carriage and other parts projecting over the same when the camera is in use are disposed entirely out of the path of engagement with said camera bed to prevent straining of or injury to such parts.

Other objects of the invention will be fully set forth in the following specifications and will be fully understood from the description of the mechanism whereby such objects are attained.

My invention may be variously embodied, but the preferred embodiment thereof is fully illustrated in the accompanying drawings in which:

Figure —1— is a view in side elevation, partly in longitudinal section of a camera constructed in accordance with the invention, showing said camera in its open position ready to take an exposure.

Fig. —2— is a view in rear elevation of the camera body.

Fig. —3— is a fragmentary detail side elevation of the same showing recording mechanism in dotted lines.

Fig. —4— is a detail horizontal section on the line 4—4 of Fig. —2—.

Fig. —5— is a fragmentary detail vertical section on the line 5—5 of Fig. 4.

Fig. —6— is a fragmentary detail perspective view showing the hinged cover in the housing through which the film spools are introduced and removed from the housing.

Fig. —7— is a detail view in side elevation of a latch mounted in the door or gate shown in Fig. —6—.

Fig. —8— is a detail perspective view of a guide plate mounted in the loading door of the camera housing.

Fig. —9— is a view in elevation of the inner face of the removable plate for the closure for the opening in the rear wall of the camera housing.

Fig. —10— is a side elevation of the same.

Figs. —11— and —12— are detail transverse sections of the same on the lines 11—11 and 12—12 respectively of Fig. —9—.

Fig. —13— is a detail view in elevation showing the spacing bar for determining the size of the picture, in two positions.

Fig. —14— is a detail sectional view of a guide plate.

Fig. —15— is a fragmentary detail view in elevation on an enlarged scale of the upper left hand corner portion of the part shown in Figs. —9— and —14—.

Fig. —16— is a fragmentary detail view in elevation of a portion shown in Fig. —15— showing the parts in a different position.

Fig. —17— is a fragmentary detail perspective view of a corner portion of the camera housing.

Fig. —18— is a detail perspective view of the wheel for positioning the spacing bar controlling the film area exposed.

Fig. —19— is a fragmentary detail perspective view of a portion of the interior mechanism of the camera including a swinging bridge for the bellows carriage.

Fig. —20— is a central longitudinal section of the camera on the line 20—20 of Fig. —1—.

Fig. —21— is a longitudinal section on the line 21—21 of Fig. —20—.

Fig. —22— is a detail view in elevation showing a slot in the housing for the insertion of an autograph record.

Fig. —23— is a vertical longitudinal section of the camera on the line 23—23 of Fig. —2—.

Fig. —24— is an enlarged detail view of a portion of the mechanism shown in Fig. —23— showing certain parts in another position.

Figs. —25— and —26— are detail transverse sections on the lines 25—25 and 26—26 respectively of Fig. —24—.

Figs. —27— —28— and —29— are vertical longitudinal sections on the line 23—23 of Fig. —2— looking in the opposite direction to the arrows thereon and in which various parts are broken away in the different figures to more clearly show the operating mechanism.

Fig. —30— is a fragmentary detail longitudinal section of the camera, partly in elevation, showing the film spool carriages and the plunger for actuating the same.

Fig. —31— is a detail bottom plan view of the film-spool carriages looking upward from the plans indicated by the line 31—31 of Fig. —33— the guide rails for the film-spool carriages being omitted.

Fig. —32— is a detail top plan view of the film spool carriages.

Fig.—33— is a fragmentary detail section on an enlarged scale on the line 33—33 of Fig. —31—.

Fig. —34— is a fragmentary detail view in elevation showing the guide rail for the film spool carriages and the guide shoes for the latter engaged therewith.

Figs. —35— and —36— are detail transverse sections on the lines 35—35 and 36—36 respectively of Fig. —37—.

Fig. —37— is a detail section on the line 37—37 of Figs. —35— and —36—.

Fig. —38— is a fragmentary detail perspective view of the loading end of one of the film spool carriages.

Figs. —39— and —40— are detail perspective views of parts of the film spool carriages.

Fig. —41— is a fragmentary detail sectional view showing the plunger rod for actuating the film spool carriages.

Figs. —42— to —50— inclusive are detail views in elevation and section showing parts of the mechanism associated with the film spool carriages, Fig. 42 being a plan view of the gear on one of the spool engaging shafts; Fig. 43 a perspective view of a lever for operating a spool lock; Fig. 44 a perspective view of the ratchet dogs; Fig. 45 a detail sectional view on the line 45—45 of Fig. 46; Fig. 46 a fragmentary perspective view of the operating rack and coöperating parts for locking and unlocking one of the spools; Fig. 47 another fragmentary perspective view of some of the parts shown in Fig. 46; Fig. 48 a fragmentary plan view of one of the spool gears and the locking bar; Fig. 49 a perspective view of the locking bar and coöperating lever; and Fig. 50 a detail fragmentary section on the line 50—50 of Fig. 32.

Fig. —51— is a view in elevation of the bases and guide shoes for the film spool carriages.

Figs. —52— and —53— are end elevations of the bases for the film spool carriages shown in Fig. —51—.

Figs. —54— and —55— are end elevations of the guide rail for the film spool carriages.

Figs. —56— and —57— are detail top plan views of the base-plates of the film spool carriages.

Fig. —58— is a detail perspective view of a lever employed.

Fig. —59— is a detail perspective view showing one end of a portion of the operating plunger for the film spool carriages and a latch member adapted to be actuated thereby.

Fig. —60— is a fragmentary detail perspective view of a portion of a guide shoe for one of the film spool carriages.

Fig. —61— is a detail perspective view of one of the guide rails for the supporting brackets of the camera bed.

Fig. —62— is a fragmentary detail view in elevation of a part of the bellows support.

Fig. —63— is a fragmentary detail view in elevation of the inner face of a side wall of the housing showing the film winding key for primarily digitally actuating the take-up spool.

Figs. —64— and —65— are external elevations of the same in two positions.

Figs. —66— and —67— are detail longitudinal sections on the lines 66—66 and 67—67 respectively of Figs. —64— and —65—.

Fig. —68— is a sectional view on the line 68—68 of Fig. 19.

Fig. —69— is a fragmentary detail longitudinal section on the line 69—69 of Fig. —2—.

Fig. —70— is a fragmentary detail longitudinal section on the line 70—70 of Fig. —1— showing the means for preventing the camera bed being closed before the bellows carriage has been moved to the rearward limit of its movement.

My said camera comprises the housing having parallel front and rear walls —1— and —2—, parallel side walls —3— and —4— and rounded end walls —5— and —6—, the same being a shape and size to be readily carried in a pocket. The said camera body is provided in its front wall —1— with a large rectangular opening which is closed by the camera bed 7 hinged to the lower wall of the said opening and which is adapted to be supported in its open position to extend at right angles to the front wall of said body.

The said camera bed —7— constitutes a closure for the said rectangular opening in the front wall —1— of the housing and is supported to extend perpendicularly thereto by means of the brace-arms —8— pivotally secured at one end to the side edges of the bed —7— and provided at their other ends with projections —9— projecting through the guide slots 10 in the guide member —11— mounted on the inwardly projecting flanges 12 bordering the sides of the said rectangular front opening, said guide members 11 being of well known construction and the guide slots 10 thereof having recesses 13 in one wall of each at one end thereof into which said projections —9— are forced by means of flat springs —14— normally spanning the guide slots 10, whereby to hold said bed rigidly in its open position shown in Fig. —1—. To turn said bed to closed position, the braces 8 are manually pressed inwardly at their upper ends to throw the projections —9— out of the recess 13, whereupon the camera bed may be swung on its hinge in the usual well-known manner.

The said camera bed 7 carries the guide rail for the lens-board carriage 15 and the mechanism for adjusting the position of the same relatively to the film exposure plane, but said guide rail and the last-named mechanism constitute no part of the present invention, being fully described and claimed in my Patent No. 1,292,036, which was the application which was copending with my said earlier application above mentioned, except in so far as said mechanism enters into combination with other mechanism hereinafter fully described.

The bellows 16 of the camera is secured at its forward end to the lens-board mounted in the carriage 15 and is secured at its other end to a rectangular frame 17 having forwardly projecting edge flanges 18 and 19 along its upper and side edges respectively, and a similar flange 20 of greater depth at its lower edge. The said frontal opening in the wall of the body is similarly provided with inwardly extending edge flanges 21 bordering the top and side walls of said opening respectively and which are adapted to fit telescopically within said flanges 18 and 19 of said plate 17. Said flanges 12 are cut away to receive the guide-members 11, the latter being mounted to present their slotted faces flush with the externally visible faces of said flanges 12. The fourth wall of said frontal opening is bordered by the hinge member 22 to which the camera bed is pivotally secured, said member 22 consisting of a strip of metal secured to the inner face of the front wall of the housing and provided with an L shaped projection, the flange 23 of which extends parallel with said front wall and has its free edge disposed flush with the uppermost point in the convex surface of its hinge portion.

The flange 20, which constitutes a carriage for the plate 17 and will hereafter be designated by the latter name, is offset slightly upwardly from the extreme lower edge of the said plate, the latter being adapted to contact with the free edge of said flange 23 when said plate 17 is disposed at the forward limit of its movement as shown in Fig. —1—.

Mounted upon the front face of the flange 23 is one flange of an angle strip 24, the other flange of which spans the channel formed between the said flange 23 and body portion of the strip 22, the forward edge portion of said last-named flange of said angle strip resting upon the hinge portion of said plate 23. The ends of the last named flange of said angle strip are folded over to provide guides 25, which receive and guide the side edges of the carriage 20 of the plate 17.

Brackets 26 are secured along their lower edges to the flange or carriage 20 contiguous to the side edges of the latter, as shown in Fig. 70 and are secured along their rear vertical edges to the front face of the plate 17 between the side flanges 19 thereof and flanges bordering the central rectangular opening in said plate. The said brackets 26 are adapted to pass between the braces 8 as the carriage 20 moves to the forward limit of its movement. Said braces 8 are provided on their opposed inner faces with projections 27 which are adaped to be received in the grooves 28 in the outer faces of the brackets 26 as soon as the latter have made their slightest initial forward movement from the rearward limit of their movement, which is determined by and coincident with the rearward limit of movement of the carriage 20 and plate 17, thus preventing the camera bed 7 from being turned to closed position unless said carriage 20 is disposed at the extreme rearward limit of its movement. The said projections 27 contact with the lower walls of the grooves 28 when disposed in said grooves and thus prevent pivotal movement of said braces 8 relatively to the camera bed in the direction to throw the projections 9 out of the recesses 13 so that no relative movement between the camera bed 7 and the housing 1 is possible so long as said projections 27 project into the said grooves 28.

The carriage 20 carries a portion of the guide rail upon which the lens board carriage 15 moves, said parts being equipped with inter-engaging mechanism for first moving the carriage 20 to the forward limit of its movement and thus bring the plate 17 to the position shown in Fig. —1— before the said carriage 15 can pass from said carriage 20 upon the camera bed 7, said mechanism being fully described and claimed in my Patent No. 1,265,371, the application for which was copending with my said earlier application above mentioned, and constituting no part of the present invention.

The said plate 17 and carriage 20 are adapted to move bodily together with the collapsed bellows 16 and lens board carriage 15 into the housing of the camera so as to be disposed between the rear wall of the latter and the camera bed 7 when the latter is disposed in its closed position. In addition to the guides 25 for the carriage 20, the interior of the camera is provided with a plate 29 having a longitudinal guide groove 30 and a transverse guide groove 31, said plate being provided with edge flanges secured to the inner face of the side wall 3 of the housing from which the body portion of said plate 29 is separated a distance equal to the depth of its said edge flanges. The side flange 19 at one side of the plate 17 is provided with a projection 31$^a$ which engages in the guide groove 31.

The other side of the plate 17 is guided in a swinging bridge guide member 32 consisting of a strip of metal having a longitudinal groove 33 in which a projection 33$^a$ (see Fig. —20—) on the other side flange 19 of the plate 17 is received, said member 32 being pivotally secured to the upper end portion of an angle projection mounted within the housing and having its flange 34 to which said member 32 is pivoted extending parallel with one of the flanges 21 bordering the frontal opening in the housing. The pivot 35 on which the said member 32 swings is offset laterally from the plane of the slot 33 therein so that the projection 33$^a$ moving in said slot will, upon striking the end wall of the latter contiguous to said pivot, turn it on the said pivot through an arc of ninety degrees so that it will lie flat against the side flange 19 of the plate 17 which carries the projection entering the slot 33. Said portion of said flange 19 against which the said member 32 rests when in its upper possition is slightly offset to provide a shallow recess to receive said member 32 as shown in Fig. —20—.

The rear wall 2 of the housing is also provided with a rectangular opening bordered by side flanges 36 on one of which there is mounted a latch-plate having an edge recess in which the projection 37 at the free end of the member 32 is adapted to engage, the same being adapted to pass over the inclined portion 38 of said edge and strike the projection 39 bordering the recess when swung to the position shown in Fig. —19—. A spring 40 is arranged to resist the entry of the end 37 of the latch 32 into the recess in the latch plate 38 and to normally throw the projection 37 out of said recess, the same being forced into the said recess by the flange 19 of the plate 17 as the latter moves rearwardly following the throw of the member 32 into said position, thus holding the latter rigidly in place to perform its function during the major portion of the movement of said plate 17. The said member 32 thus coöperates with the guide groove 31 and the guides 25 to properly guide said plate 17 and carriage 20 in such a manner as to prevent binding of the same and insuring free and smooth movement thereof.

The opening in the rear wall 2 of the housing is adapted to be closed by a removable plate 41 having a central rectangular opening adapted to be closed by a hinged door 42 and on which there is mounted a frame 43 carrying a pane of ground glass, said frame 43 being operatively connected with said door 42 to move the ground glass into the exposure plane as said door is opened and moving the same out of said plane as said door is closed. The said plate 41 also carries shafts equipped with wings adapted to fold over upon the edges of film which become disposed in the exposure plane to hold said film perfectly flat, said parts being fully described and claimed in my copending application filed the 13th day of Oct. 1919, Serial No. 330,680, and particular references being herein made thereto only in so far as said parts coöperate with other parts or mechanism to carry out the main objects of the invention.

Upon the side wall 4 of the housing there is mounted a guide rail 44 which consists of a flat plate having opposed channeled edge or guide flanges 45, the latter being raised to provide free spaces between the same and the inner face of the said side wall 4. On this guide rail 44 the carriages for the film-spool containers are longitudinally movable in the camera housing.

The said carriages (Figs. —51 to 57— inclusive and Figs. —33, 35, 36 and 37—) comprise plates 46 and 47 having parallel side flanges 48 and 49 each extending some distance beyond one end of said respective plates and which are provided along their lower edges with channeled guide shoes 50 and guide flanges 51 respectively. The guide shoes 50 are adapted to receive the channeled guide rails 45 and the guide flanges 51 are adapted to enter the said channels 45 so that the said members 50 and 51 are adapted to overlap each other on opposite sides of said channels 45 and both be guided thereby. Each of said plates 46 and 47 is, as shown in Figs. —52 and 53—, provided with a substantially cylindrical raised middle portion having a central opening and which is adapted to project through an opening in a plate $46^a$ and $47^a$ respectively, said plates being shown in elevation in Figs. —54 and 55— and in plan view in Figs. —56 and 57— said openings in said plates $46^a$ and $47^a$ being bordered by the overturned flanges $46^b$ and $47^b$ respectively. Said plates $46^a$ and $47^a$ are also provided with flanges $46^c$ and $47^c$ adapted to receive and engage the end edges of the plates 46 and 47 to rigidly secure said plates $46^a$ and $47^a$ thereto. Tubes —52 and 53— having inwardly projecting flanges $52^a$ and $53^a$ at their lower ends are adapted to be secured upon the plates $46^a$ and $47^a$ respectively, said flanges $52^a$ and $53^a$ being engaged between the flanges $46^b$ and $47^b$ and the upper faces of said plates $46^a$ and $47^a$, this being more fully illustrated in Fig. —33— and in Figs. —35— 36 and 37. The said tubes —52— and —53— constitute film spool containers and each of the same is provided with a longitudinal slot 54 and 55 respectively which oppose the rear wall 2 of the camera housing and each other. In each of said slots there is mounted a longitudinally disposed roller 56 over which the film is trained in passing from the container 52 into the container 53. The contiguous edges of said slots are bordered by the flanges 57 and 58 which are adapted to overlap as shown in Fig. —1— when said containers are disposed at the inner limit of their relative movement.

Each of said containers 52 and 53 is provided with a hinged cover 59 as shown in detail in Figs. —30— 32 and —38— each of said covers being equipped with a spring held latch member 60 pivotally secured to the head of the cover and having a downwardly projecting hook 61 adapted to engage a projection 62 on the circumferential wall of the cylinder capped by and rendered light-proof by said cover, said projections being disposed behind the flanges 57 and 58 respectively and the hinges 63 for said covers being disposed diametrically opposite said projections 62.

Each of said covers 59 is also equipped with a guide rail 64 which is longitudinally movable in the guide groove 30 of the plate 29 and in a similar guide groove 65 in a plate 66 mounted in the loading door 67 of the camera housing, said plate 66 constituting a continuation of the plate 29 when said loading door is closed, and the latter constituting a part of and being hinged to the side wall 3 of the housing. Said loading door has a rounded end portion which is bordered by a rounded edge flange 68 in which an edge portion of the rounded end wall 5 of the housing is received, and the parallel side edges of said loading door are provided with flanges 69 which enter between the edge portions of the front and rear walls 1 and 2 of the housing to provide light proof joints. By reference to Fig. —6— it will be seen that at the meeting point of the flange 68 with one of the flanges 69 the latter is offset inwardly to correspond with the offset of the corresponding edges of the front wall and rounded end wall of the housing. A portion of the other flange 69 corresponds in depth with and constitutes a continuation of the flange 68 and has a shallower offset portion which is received within the edge portion of the rear wall of the housing.

Mounted within the flange 68 is a substantially semi-cylindrical spring latch member 70 which is secured at its middle portion to the middle portion of said flange 68 and is provided at its ends with flanges 71, each of which is provided with perforations 72 adapted to receive projections 72ª on the opposed rounded end wall 5 of the housing as said door is closed to hold the latter in said position. Buttons 73 secured to said end portions of said member 70 project through openings in the flange 68 and are digitally pressed simultaneously inwardly to release said projections from engagement in the said perforations 72.

The hinged connection between the said loading door 67 and the side wall 3 of the housing is made by means of a pair of flat springs 74 secured to the inner face of said side wall at some distance from the edge thereof opposing the inner end of said door. Said springs carry one of the hinge members for the loading door which is disposed contiguous to the meeting edges of the latter and said side wall, the said edge of said door carrying the other hinge member receiving the pivot pin 75. The ends of the flat springs 74 are normally disposed below and are adapted to be raised to contact with the inner face of the said side wall to which they are secured thus enabling the hinge to be raised as the loading door is opened and permitting the upper face of the latter to lie flat upon the upper face of the said side wall without in any way straining said hinge. The flange 68 of the said loading door is adapted when said door is closed to rest upon suitable stops 68ª mounted on the front and rear walls of the housing thus preventing depression of the hinge at this time.

Each of the covers 59 of the firm spool containers 52 and 53 is provided with a central projection 76 on its inner face which is adapted to engage in the central opening of a film spool contained in said respective containers. The said container 53 is adapted to receive an empty or take-up spool. These spools are of well-known construction, having central openings to receive the pivot device of many film cameras now in use and having a lateral slot in one end to engage the cross-head of the manually operable winding key provided on many film cameras. The said winding key is always engaged with the take-up spool for winding film upon the latter and from the feedspool. For the present device the film spools should be provided at both ends with diametric slots.

The said containers 52 and 53 are equipped with film spool engaging means which are mounted in and project through the dished portions of the carriages or bottom plates 46 and 47 of said containers, as shown in Fig. —33—.

The film spool engaging device of the container 52 comprises a shaft 77 which is provided in its upper end projecting into said container with a cross-head 78 which is adapted to engage in the lateral slot in the film spool in the usual manner. The said shaft is provided between its ends with an annular flange 79 which is adapted to bear upon the lower face of the central dished portion, the latter being adapted to contain a pair of ratchet wheels 80 and 81 respectively, the teeth of which project in respectively opposite directions. These ratchets are adapted to be engaged by dogs as will be hereinafter more fully described, which control the unwinding and rewinding of the film from and upon the spool engaged with said shaft. Said shaft 77 is further engaged by a brake or retarding mechanism which consists of a spring 82 coiled about and imposing a frictional resistance to the rotation of said shaft.

The film-spool-engaging device of the container 53 comprises a shaft 83, provided with a cross-head 84, which may be integral thereto with or keyed thereto, and is further equipped with what I term a rachet disk 86 mounted in the recessed lower face of the gear 85. Associated with said disk 86 is a spring dog 87 which is rigid with a spur pinion 88 rotably mounted on a sleeve 89 rigid with said shaft 83. The lower end of the said sleeve 89 is provided with a lateral slot 90 in which the cross-head 91 of the hollow stem 92 of the shaft 93 of the film winding key 93ª is adapted to project when it is desired to manually rotate said shaft 83 to cause film to be wound upon the take-up spool and unwound from the feed spool.

The said digitally operable means for actuating the take-up spool shaft 83 is shown in detail in Figs. —63— to —67— inclusive.

By reference to those figures it will be seen that the shaft 92 to which the key 93ᵃ is pivotally secured projects through an opening in the side wall 4 of the housing, the inner end thereof being engaged by a flat spring 94 secured to said wall 4 at one end and engaged with the said shaft 92 at its other end in such a manner as to permit rotation of said shaft relatively to said spring. The shaft is provided with an annular groove in which the walls of one end of a keyhole slot 95 in said spring engage. Said spring tends to normally maintain said shaft 92 at the inner limit of its movement and in engaging relation to the shaft 83, the inner end of said shaft 92 being provided with a central recess adapted to receive the lower end of the shaft 83 and being provided with said cross-head or rib 91 for engaging in the diametric slot 90 within said recess.

The opening in the wall 4 through which the shaft 92 projects is disposed in the bottom of a stepped recess 96 which is adapted to receive the winding key 93ᵃ when the latter is turned so that its flat faces lie parallel with the plane of said wall 4. As shown in Figs. —64— and —65—, the outer end of the shaft 92 is cut away at the sides to receive the lateral projections 97 at the inner end of the key 93ᵃ the same being pivoted on an axis intersected by the section line 66—66. The said projections 97 serve when the key is turned to the position shown in Figs. —64— and —66— to bear upon the washer 99 disposed in the bottom of the stepped recess 96 and to draw the said shaft 92 outwardly to the position shown in Fig. —66—, and out of the path of travel of the same in the reciprocal movement of the film spool carriage 47 on the guide rail 33. It will also be seen that in order that the said shaft 92 may engage the shaft 83 for rotating the latter, the said film spool container 53 must be positioned at the extreme limit of its movement in one direction and that by the telescopic entry of the lower end of the shaft 83 into the hollow upper end of the shaft 92, the said carriage 47 cannot be moved reciprocally of the housing until the key 93ᵃ is thrown to the position shown in Fig. —66—.

The winding key 93ᵃ is actuated only at the time of insertion of a new film spool in the container 52 for the purpose of rolling up the black paper backing or tongue secured to the forward end of the film so as to wind the same upon the said take-up spool engaged with the shaft 83 and until the forward end of the sensitized film shall have been unwound from the feed spool and become visible opposite the overlapping flanges 57 and 58 of the said containers 52 and 53. The rear wall of the housing is equipped with an opening 98 (Fig. —2—) fitted with orange or red glass and normally maintained closed by a shutter of any suitable construction through which the travel of the black paper and film may be observed during the rotation of the shaft 92 by means of said key 93ᵃ and while said shaft 92 is engaged with the shaft 83. The said observation opening is not specifically illustrated as it will be readily understood without the same.

As previously stated, the shaft 77 carries two ratchet wheels 80 and 81 rigid therewith and having their teeth projecting in respectively opposite directions. The upper ratchet 80 is engaged at all times by the pawl 100 pivotally mounted between its ends on the pin 101 mounted in the plate 102 disposed parallel with the plate or carriage 46. On said pin 101 a lever 103 is also pivotally mounted between its ends, said lever being pivotally connected at one end with the semi-circular arm 104 of a reciprocable plunger 105 projecting through a suitable guide recess in a flange 106 at the forward end of the carriage 46 and which is guided by the same and its pivotal connection with said lever 103, the function of said plunger being hereinafter fully set forth.

Mounted on a pin 107 of the carriage 46 is the middle coil of substantially semi-circular spring 108 one arm of which engages in a recess in the outer end of the pawl 100 to hold the other end of the latter engaged with the ratchet 80. The other arm of said spring engages in a similar recess in a projection 109 of the plunger 105 to hold the latter normally at the forward limit of its movement. The pawl 100 and the ratchet wheel 80 co-act to permit film to be unwound from the feed spool engaged with the shaft 77 and prevent rotation of the latter in a direction to cause film to be unwound upon the feed spool.

The plate 102 has an inverted U-shaped projection 110 at one end and adjacent one side thereof in which one end of a rocking arm 111 is pivotally secured, the said arm 111 extending beyond the opposite side of said plate and provided at its other end with a downwardly extending shallow curved flange 112 having a recess 113 between its ends in its outer convex face in which the convex projection 114 of a spring tongue 115 in the extension portion of the vertical flange 49 of the guide rail 51 of the carriage 47 is adapted to engage for turning said arm on its pivot to the limited extent permitted by the flanges of said U-shaped projection 110. The lower face of said arm 111 bears upon the upper face of a rack-bar 116 extending parallel with the guide rail 44, said rack-bar hereinafter more fully described. Mounted on the lower face of said arm 111 is a flat spring 117 the outer end of which bears upon the lower face of said rack-bar 116 to frictionally engage the latter. Said rack-bar is slightly reciprocable and the purpose of said frictional engagement of the arm 111 and spring 117 therewith is for the purpose of actuating said arm 111 by said rack-bar at certain times as will be hereinafter fully described.

The said arm 111 carries a pawl 118 which is integral therewith and constitutes an L-shaped projection formed in one of the side edges thereof, said pawl 118 being adapted to engage the ratchet 81 for preventing rotation of the shaft 77 in a direction to unwind film from the feed-spool engaged with said shaft, said pawl being thrown into engagement with said ratchet at predetermined intervals, as will hereinafter more fully appear.

The carriage 46 is reciprocably movable on the guide rail 44 to an extent determined in one direction by the spacing bar 119 and in the other direction by the rounded end wall 5 of the housing. The said spacing bar is pivotally mounted at one end in a projection 120 mounted on the front wall 1 of the housing contiguous to one of the guide flanges 45 of the guide rail 44 and at its other end in a boss 121 in the rounded end wall 6 of the housing through which it projects. At its projecting end said spacing bar is equipped with a knurled wheel 122 by means of which said bar is turned to either of its three positions. Said wheel 122 is confined between the boss 121 and a flange 121ᵃ overhanging the same to hold the spacing bar against longitudinal movement. Said spacing bar 119 is provided with a plurality of radially disposed flanges 123, 124 and 125 respectively, and is adapted to be rotated to bring one of said flanges into a given position to determine the limits of movement in one direction of the said carriages 46 and 47. As shown in Fig. —19— said flanges are adapted to engage in the concavo-convex end portion 126 of a spring 127 mounted on the front wall of the housing, said spring being adapted to hold said spacing bar firmly but yieldingly in any one of its three operative positions; that is to say the bar may be rotated against the action of said spring to cause any one of its several flanges to be sprung into said portion 126 thereof, the latter engaging in end recesses 128 in said flanges.

The purpose of the spacing bar 119 is to limit the longitudinal movement of both the film spool carriers so as to determine the film area becoming disposed in the exposure plane. It will be noted that normally both these carriages are disposed in one end of the housing and out of the path of the rear frame to which the bellows is attached and that while said carriages are disposed in this position the camera shutter may be opened and the picture focused on the ground glass disposed in the rear wall of the camera without exposing any of the film to the light rays thus admitted. When in this position there is a very short length of film disposed between the idle rolls 56 of the film spool carrier, but the space between the flanges 57 and 58 and the rear wall of the camera is, by means of velvet or similar material, closing the cracks or very small open spaces through which light might be admitted, rendered absolutely dark or impervious to the light rays admitted through the lens and the ground glass, as aforesaid.

The carriages for the film spools are adapted to be moved simultaneously longitudinally of the housing until the carriage 46 attains a position determined by a stop on one of the flanges of the spacing bar 119, and thereupon the said carriages are automatically uncoupled and the movement of the carriage 47 may be continued to another position determined by a stop on the same flange of the spacing bar which is then positioned to determine the relative limits of movement of both carriages in this one direction.

Each of the flanges of the spacing bar 119 is adapted to fix a different relative position of the carriages so as to expose either the full film area for the maximum size picture adapted to be taken by the camera or to expose only two-thirds or one-third of said area, and to cause the area exposed to become positioned in the middle of the exposure plane.

It will be noted that the cariage 46 is provided at one side with a lever carrying a projection 128 which is adapted to move along the lower face of a flange of said spacing bar 119, and to strike a stop projection 130 on said flange whereby to limit what I will term the forward movement of said carriage. The said stop 130 is disposed upon the flange 123 of said spacing bar and is adapted to limit the movement of the carriage 46 to adapt the said carriages when separated to their fullest extent to expose the maximum film area. The said flange 123 is provided with only one stop projection which serves to limit the forward movement of the carriage 46, the carriage 47 being adapted to strike the end wall 6 of the housing to limit its forward movement. The carriage 47 is similarly provided with a lever having a projection 131 which moves along the upper face of the flange 124 or 125 of said spacing bar and is adapted to engage an upwardly extending projection 133 on the flange 124 for limiting the forward movement of the carriage 47 so that it is separated from the carriage 46 a distance sufficient to expose two-thirds of the maximum film area. Thus the flange 124 is provided with a stop projection 132 for limiting the forward movement of the carriage 46 and said projection 133 for similarly limiting the forward movement of the carriage 47 and to so relatively position said carriages with respect to each other and the exposure plane as to cause two-thirds of the maximum film area to become disposed midway between the ends of the latter. Similarly the projections 134 and 135 of the flange 125 of said spacing bar 119 are disposed nearer together than the similar projections of the flange 124 so as to limit the relative forward movements of the carriages 46 and 47 to cause only one-third of the maximum film area to become disposed in the exposure plane, said stops being also positioned as aforesaid to cause film which is so exposed to become positioned midway between the ends of the exposure plane.

Reciprocal movement is imparted to both the carriages 46 and 47 by means of the plunger rod 137 which is rigidly connected at its inner end with the carriage 47, and projects through the rounded end wall 6 of the housing contiguous to the side wall 4 thereof. The said rod 137 carries a sleeve 138 which is rotatable relatively thereto but incapable of longitudinal movement thereon. Threaded into the outer end of the sleeve 138 is the shank of a head 139 which is provided also with a central threaded opening in which the threaded shank 140 at the outer end of said rod 137 is threaded. The end portion of the sleeve 138 receiving the shank of the head 139 is annularly enlarged to provide shoulders for limiting the movement of the head 139 relatively to said sleeve and the threads of the said shank 140 and the shank of the head 139 are respectively right and left. The plunger rod 137 has an ogee-curved inner end portion 141 which is secured to the plate 142. The latter being provided with a recess 143 to receive said end, said rod being thus incapable of rotation relative to said plate 142, and the latter being rigidly mounted in the carriage 47. Mounted on said head is a removable knurled nut 144 threaded into the same in such a manner as to enable it to be turned to the right to be removed, but when turned to the left to rotate said head 139. The shank of the latter is similarly threaded, but is incapable by reason of the aforesaid shoulders limiting its movement relatively to the tube 138 to rotate relatively to the latter and said tube will, therefore, rotate with said head 139 when the latter is turned to the left by the threaded connection between said head and the shank 140 of said plunger rod 137 so that said tube may be rotated to the desired extent. The inner end of said tube 138 is provided with a recess 143ª, shown in Fig. —59— in which the projection 144ª on an oscillating arm 145 is adapted to engage, said arm being pivotally mounted upon the front end of the carriage 47 and upon the plunger rod 137.

By means of the said plunger rod 137 the carriage 47 is moved forward. Said carriage is provided with a lever 146 provided with a recess 147 in one side thereof, said lever being provided at its other end with the projection 131 adapted to engage actuating means whereby the recess 147 is thrown out of engagement with a projection 148 on the forward end of the carriage 46. The said means for actuating the said lever 146 consists of inclined projections 149 on the several flanges of the spacing bar 119, which said projection 131 strikes and by which it is moved out of their path to swing said lever on its pivot to throw it out of engaging relation to said projection 148. The said inclined projections 149 are so located relatively to the projections of the spacing bar adapted to be engaged by the projection 129 as to cause the said lever 146 to be thrown out of engagement with the projection 148 just as the projection 129 contacts with one of the stops of the spacing bar for limiting the forward movement of the carriage 46. The said carriage 47 is thus enabled to move farther forward to the predetermined limit of its movement independently of the carriage 46. During the period of the independent forward movement of the latter relatively to the carriage 46 film will be unwound from the feed spool of the carriage 46 against the frictional retard of the brake spring 82 on the shaft 77, the take-up spool of the carriage 47 being held against rotation in the said carriage during such forward movement of the latter. The said spur pinion 88 of the latter meshes with the rack bar 116 and rotates as said carriage 47 is reciprocably moved relatively to said rack bar, as will be obvious. The said spur pinion 88 is rigid with the disk 87 so as to cause the latter to rotate therewith. The said disk is provided with two spring tongues or arms 150 which constitute spring-dogs adapted to engage at their outer or free ends in the openings 151 in the disk 86, said disk being, as previously stated, rigid with the spur gear 85 on the shaft 83. The said openings 151 and spring-dogs 150 are relatively arranged so that when the free end of one of said dogs engages a radial wall of an opening 151, the free end of the other dog 150 will be disposed practically midway between the radial walls of a diametrically opposed opening so that only one of said dogs is at any one time engaged with the disk 86 to cause the latter and the spur gear 85 to rotate with the spur pinion 88, such rotation occurring during the movement of the carriage 47 toward the carriage 46 after the latter has been separated to unwind film from the feed spool.

The pitch diameter of the spur gear 88 is less than the smallest diameter of the take-up spool plus the paper and film wound upon the same so that during the return movement of the carriage 47 relative to the carriage 46 the film will be taken up with greater rapidity than the return movement of the carriage, that is to say the said take-up spool will be rotated at a speed adapted to take up more of the film than has been unwound from the feed spool during the separating movement of the carriages 46 and 47. This is accomplished by a frictional engagement between the said disk 86 and the said spur gear 85 whereby the latter are enabled to rotate relatively to each other against a frictional contact sufficient to impart that degree tension to the film being taken up to prevent any slack occurring in the latter.

During the separating movement of the carriages 46 and 47 the feed spool must be free to rotate in a direction to permit film to be unwound therefrom; this being attained by releasing the dog 118 from the ratchet 81 which is accomplished by the frictional engagement of the rack bar with the arm 111 with which the said dog 118 is integral; said dog being maintained disengaged upon the ratchet during the entire period of the unwinding of film during the relative separating movement of the carriages. The rack bar is capable of a very slight reciprocable movement relative to the housing, having bifurcated ends engaging projections on a side wall of the housing. In the plate 142 there is provided a spring tongue 152 which bears upon the upper face of the rack bar to frictionally engage the latter with the carriage 47 and by reason of the meshing of the spur pinion 88 with said rack bar and the resistance offered to the rotation of said spur pinion, the rack bar will, upon the initial return movement of the carriage 47, be moved to the rearward limit of its movement, and by its frictional engagement with the arm 111 will throw the dog 118 into engagement with the ratchet 81 where it will remain during the winding of the film upon the take-up spool. The spur pinion will continue to rotate during the entire rearward movement of the carriage 47, but as soon as the latter collides and becomes coupled with the carriage 46 upon the return movement by means of the lever 146, the said spur gear 85 will be engaged by the tooth 153 at the forward end of the projection or plunger 105 which will prevent the further rotation of said spur gear and the shaft of the take-up spool, so that during the further return movement of both carriages to the rearward limit of their movement, the spur pinion must necessarily rotate against the frictional resistance of the disk 86. As the said carriage 46 reaches the rearward limit of its movement, the end of the lever 103 will engage a projection 154 on the wall of the housing which is disposed in the path of the outer end of said lever, as shown in Fig. 37, thereby turning said lever on its pivot and drawing the plunger 105 forward against the action of the spring 108 and thus releasing the tooth 153 from engagement in the spur gear 85, thereby permitting the take-up spool to be manually rotated by the winding key 93ª, if desired.

It will further be obvious that when the carriage 46 is disposed at the inner limit of its movement, which is its normal position, the dog 118 must be disengaged from the ratchet 81 in order that film may be unwound from the feed spool upon manually actuating the take-up spool by means of said winding key 93ª. To this end a projection 158 is mounted on the upper face of the rack bar 116 in the path of the arm 111 with which said dog 118 is integral, said projection serving to throw the said dog 118 out of engagement with the ratchet 81 as shown in Fig. 27.

Associated with the said spur gear 85 is a dog 155 which is adapted to engage therein and is held in engagement therewith by means of the spring 156, said dog serving to prevent rotation of the gear 85 in a direction to permit rotation of the take-up spool to unwind film therefrom, said take-up spool being thus permitted to rotate in only one direction unless engaged by the tooth 153, and when engaged by the latter being held against rotation in either direction. Upon separation of the carriages, the said tooth 153 is obviously withdrawn from engagement with the said spur gear 85, thus leaving the latter free to rotate in the direction to take up film.

Upon a side flange of the carriage 46 and above the guide shoe 50 there is pivotally mounted a lever 157 which is provided at one end portion with the said projection 129 which is adapted to engage the stops on the flanges 123 and 124 and 125 of the spacing bar for limiting the forward movement of said carriage 46, the said lever being normally held so that said projection is disposed in the plane of the actively positioned flange of said spacing bar by means of the spring 159 engaging the rear end portion 160 of said lever, the forward end of the latter being positioned in the path of the free end of the arm 145 when the carriage 47 is coupled with the carriage 46 so that when the latter is turned by the tube 138 it will turn said lever 157 on its pivot to cause said projection 129 to be withdrawn from the recess in the active flange of the spacing bar 119 in its path upon its return or rearward movement, which it strikes simultaneously with the coupling of the carriages 46 and 47 thus permitting both said carriages to be returned to the rearward limit of their movement.

On the lower face of the plate 142 below the tongue 152 there is pivotally mounted a lever 161, which is shown in Fig. 21, said lever being provided at its forward end with an inclined downwardly projecting flange 162. Said lever is pivoted between its ends on a projection entering the opening 163 in said plate 142 and is held by means of a spring 164 at one limit of its movement by throwing the end thereof opposite the end carrying the flange 162 against the flange 49 of the carriage 47 or any other suitable stop. Mounted upon the base of the guide rail 44 is a bar 165 which is provided with parallel inclined slots 166 through which the screws 167 pass, the latter acting as guides for said bar which is adapted to move reciprocably in the plane of said slots 166. Said bar is further provided with three projections 168 disposed in the path of the forward end of the flange 162 of said lever 161 so that as the carriage 47 moves forward, said forward end of said flange 162 will strike said projections 168 successively for imparting reciprocable movement in one direction to said bar 165 against the action of the spring 169 which normally holds said bar at the rearward limit of its movement. The lateral movement of the bar due to the inclination of its slots 166 causes each of the projections 168 engaged by the flange 162 to be moved out of the path of said flange as said carriage 47 moves past each of said projections 168. At the forward end of said bar 165 is a projection 170 having a slot 171 therein in which the arm 172 of a rack shaft 173 engages, said shaft extending parallel with the axis of the rounded wall 6 of the housing and being pivotally secured to the latter and extending the full length thereof. At its other end said shaft 173 is provided with a crank arm 174 which engages in a dog 175 engaging a ratchet wheel 176 rotatably mounted on the side wall of the housing, said dog 175 being provided with a longitudinal slot 177 through which a set screw or a guide projection 178 extends. The other end of said dog is held in engagement with said ratchet wheel 176 by means of the spring 179, the latter also engaging a pawl 180 engaged with said ratchet wheel 176, and which is pivotally mounted upon the end wall 3 of said housing. The said ratchet wheel 176 has, in the instance illustrated, thirty teeth equally spaced and is provided with ten equally spaced main graduations indicated by numerals from "1" to "10" inclusive, spaced apart a distance equal to the length of the arm covered by three teeth of said wheel. Each of the spaces or graduations indicated by one of said numerals indicates the length of maximum exposure plane. The camera is adapted to receive a film spool carrying a length of film sufficient to provide ten full or maximum length exposures, and when said film is exposed in maximum lengths, each exposure thereof will be recorded by the said wheel 176 by bringing the numerals "1" to "10" inclusive, successively into view through the slot 181 in the said wall 3 of the housing, so that if the said wheel is set to expose the numeral zero in the slot 181, it will be again exposed in said slot when the total length of film on the spool has been exposed. If the spacing bar is set to expose only one-third or two-thirds of the maximum length of the film at each exposure, then the said wheel will record either one-third or two-thirds of an exposure, this being accomplished by means of the aforesaid projections 168 of the bar 165. If the spacing bar is set for the maximum exposure, then during the travel of the carriage 47 to the farthest limit of its outward movement the flange 162 of the lever 161 will successively strike all three of said projections 168, thus reciprocating said bar 165 three times and similarly oscillating the crank shaft 173. At each oscillation of the latter, the ratchet wheel 176 will be rotated through an arc equal to the distance separating two of the numerically indicated graduations thereof. But if the spacing bar is set for only two-thirds exposure, then the flange 162 of the lever 161 will strike only two of the projections 168 and thus only twice reciprocate the bar 165 and only twice oscillate the crank shaft 173, thus recording two-thirds of a full exposure at the opening 181. And similarly, if the spacing bar is set for the smallest or one-third exposure, the bar will be oscillated only once and the wheel 176 turned only a distance equal to the length of one of its teeth, thus recording one-third of a full length exposure.

The said flange 162 of said lever 161 will always pass each of the projections 168 engaged thereby during outward travel of the carriage 47 and said lever is so arranged that it will not turn on its pivot during such outward movement. During the return movement thereof, however, the inclined face of the flange 162 opposing the other ends of the projections 168 will strike said projections and will cause the lever 161 to be turned on its pivot against the action of the spring 164 as said flange 162 passes each of said projections 168. In this way a perfect record of the total length of film exposed is always kept so that the operator of the instrument may know when his supply on the feed spool has been exhausted.

While the film feeding mechanism of the carriages 46 and 47 is adapted to stretch the film relatively taut in the exposure plane it will be obvious that such film may curl slightly in said plane and this would obviously throw a part of such film forward of said exposure plane, thus blurring the portion of the picture not properly focused thereon. This would be most apt to occur as the length of film exposed increases, and in order to guard against this I have provided mechanism for holding the middle portion of the film disposed in the exposure plane down against the ground glass backing of said exposure plane, said means operating only for the full exposure and two thirds exposure respectively, but being unnecessary for less than two-thirds exposure. The said means comprise two oscillating shafts 182 and 183, extending parallel with the side walls 3 and 4 of the housing and disposed along the side edges of the plate 41 closing the posterior opening in the housing, said shafts being suitably pivotally mounted on the said plate 41. Each of said shafts is provided at one end with a small crank 184, said cranks on said respective shafts being diametrically opposed to each other, and being connected to turn said shafts in unison in respectively opposite directions by means of the connecting rod 185 extending transversely of the housing contiguous to one end of the plate 41, said rod 185 being normally held at one limit of its movement by means of the tension spring 186 engaged with an offset portion 187 between the ends of said rod. Mounted upon and rigid with said shafts 182 and 183 are wings 188 which normally extend parallel with the side walls 3 and 4 of the housing, but which are turned to extend parallel with the exposure plane and project over the edges of the film when the said connecting rod is moved longitudinally against the action of said spring 186. The said connecting rod 185 is operatively engaged with an oscillating member 189 pivotally secured by means of the pin 190 to the plate 41 and which is provided with an edge flange 191 normally disposed at an incline to and in the path of travel of a projection 192 at one side of the carriage 47 so that, as the latter is moved to the outer limit of its movement, when the spacing bar 119 is set for either the maximum or two-thirds maximum exposure, said projection 192 will strike said flange 191 and thus oscillate said member 189 thereby causing the connecting rod 185 to be moved against the action of the spring 186 to turn the shafts 182 and 183 through an arc of ninety degrees, thus throwing the said wings 188 over the edges of the film disposed in the exposure plane. This aids the tension mechanism in maintaining said film taut to hold said film properly exposed in the exposure plane. It will be observed that the spring 186 is relied upon to return the wings to their normal position but in order to insure such return, the shaft 182 is provided with a projection 193 which extends in the diametrically opposed direction from the wing 188 on said shaft and which, when said wing 188 is folded down upon the film, becomes disposed in the path of the inclined face of a projection 194 on the carriage 147 so that as said carriage is returned to its normal or rearward limit, said inclined edge will strike said projection 193, thereby turning the shaft 182 to its normal position and through the connecting rod 185 obviously will also similarly turn the shaft 183. Obviously, said projection 194 will become active to perform its function only in the event that the spring 186 fails to do so.

I claim as my invention:

1. In a folding camera, the combination with film spool carriages reciprocably movable in the housing for disposing film in the exposure plane, of a bellows support reciprocably movable transversely within the housing and in the path of the film spool carriages and adapted to prevent movement of the latter when the bellows is projected into said housing.

2. In a folding camera having a reciprocable film spool carriage and a bellows-support for the inner end of the bellows movable transversely of the path of travel of said film spool carriage, a housing, a guide groove therein, guides for said bellows-support comprising a projection at one side of said support movable in the guide groove within the housing, a guide member pivotally mounted within the housing and having a longitudinal slot, a projection on the other side of said support engaging in said slot and adapted to turn said guide member on its pivot to span the space between the front and rear walls of said housing as said support moves from its forward to its rearward position and to move longitudinally in said slot to guide said support, said member being turned by said projection engaged therein to be disposed out of the path of travel of said film spool carriage.

3. In a folding camera having a reciprocable film spool carriage, and a bellows-support for the inner end of the bellows, movable transversely of the path of travel of said film spool carriage, a housing, guide grooves within the housing, guides for said bellows-support comprising a projection at one side of said support movable in one of said guide grooves within the housing, a guide member pivotally mounted within the housing and having a longitudinal slot, a projection on the other side of said support engaging in said slot and adapted to turn said guide member on its pivot to span the space between the front and rear walls of said housing as said support moves from its forward to its rearward position and to move longitudinally in said slot to guide said support, a supporting member on the rear wall of the housing for the outer end of said guide member having a recess adapted to receive the latter when turned to span said space, said member adapted to be moved laterally to engage in said recess as said bellows-support moves rearwardly.

4. In a folding camera having a reciprocable film spool carriage, and a bellows-support for the inner end of the bellows, movable transversely of the path of travel of said film spool carriage, a housing, guide grooves within the housing, guides for said bellows-support comprising a projection at one side of said support movable in the guide groove within the housing, a guide member pivotally mounted within the housing and having a longitudinal slot, a projection on the other side of said support engaging in said slot and adapted to turn said guide member on its pivot to span the space between the front and rear walls of said housing as said support moves from its forward to its rearward position and to move longitudinally in said slot to guide said support, a supporting member on the rear wall of the housing for the outer end of said guide member having a recess adapted to receive the latter when turned to span said space, and a spring disposed in the said recess for resisting the engagement of said guide-member therein, said member adapted to be moved laterally to engage in said recess as said bellows-support moves rearwardly.

5. In a film camera, a housing, a pair of film spool carriages reciprocably movable in said housing relatively to the latter and to each other, a pair of guide rails for said carriages, and guide-shoes on the latter engaging opposite faces of said guide rails, said guide-shoes of each carriage being of greater length than the latter and adapted to project under the other of said carriages as the latter approach each other.

6. In a film camera, a housing equipped with parallel opposed channeled guide rails, a pair of film spool carriages reciprocably movable on said guide rails relatively to said housing and each other, a pair of guide shoes on each carriage projecting beyond one end thereof and toward the other carriage, the guide-shoes of one carriage engaging the inner faces of the rails and the guide-shoes of the outer faces thereof.

7. In a film camera, a pair of film spool carriages reciprocably movable in the housing thereof relatively to the latter and each other, one of said carriages adapted to contain a feed-spool and the other thereof a take-up spool, mechanism on the take-up spool carriage adapted to prevent rotation of the take-up spool as said carriages are separated, coacting means on said take-up spool carriage and the housing for rotating said take-up spool as said carriages approach each other, and means on said feed-spool carriage adapted to engage the mechanism on said take-up spool carriage for preventing rotation of the take-up spool as said carriages reach the limit of their relative movement.

8. In a film camera, a pair of film spool carriages reciprocably movable in the housing thereof relatively to the latter and each other, one of said carriages adapted to contain a feed-spool and the other thereof a take-up spool, mechanism on the take-up spool carriage adapted to prevent rotation of the take-up spool as said carriages are separated, coacting means on said take-up spool carriage and the housing for rotating said take-up spool as said carriages approach each other, and means on said feed-spool carriage adapted to engage the mechanism on said take-up spool carriage for preventing rotation of the take-up spool as said carriages reach the limit of their relative movement, and coacting means in the feed-spool carriage and housing for releasing the last-named means from engagement with the last-named mechanism as said feed-spool carriage reaches one limit of its reciprocal movement relatively to said housing.

9. In a film camera, a pair of film spool carriages reciprocably movable in the housing thereof relatively to the latter and each other, one of said carriages adapted to contain a feed-spool and the other thereof a take-up spool, mechanism on the take-up spool carriage adapted to engage the take-up spool for rotating the latter in one direction, means on the housing engaged with said mechanism for actuating the same as said carriage approaches the feed-spool carriage and means carried by the latter for engaging said mechanism against actuation as said carriages reach a limit of their relative movement.

10. In a film camera, a pair of film spool carriages reciprocably movable in the housing thereof relatively to the latter and each other, one of said carriages adapted to contain a feed-spool and the other thereof a take-up spool, mechanism on the take-up spool carriage adapted to engage the take-up spool for rotating the latter in one direction, means on the housing engaged with said mechanism for actuating the same as said carriage approaches the feed-spool carriage, and means carried by the latter for engaging said mechanism against actuation as said carriages reach a limit of their relative movement, and coacting means on the feed-spool carriage and housing for releasing the last-named means from engagement with the last-named mechanism as said feed-spool carriage reaches one limit of its reciprocal movement relatively to said housing.

11. In a film camera, a pair of film spool carriages reciprocably movable in the housing thereof relatively to the latter and each other, one of said carriages adapted to contain a feed-spool and the other thereof a take-up spool, mechanism on the feed-spool carriage adapted to engage the feed-spool and to be actuated by rotation of the latter, brake-mechanism engaged with the first-named mechanism for resisting rotation of said feed-spool, mechanism on the take-up spool carriage adapted to engage the take-up spool to rotate the same in one direction, means for holding the said mechanism against rotation as said carriages are separated whereby to cause film to be unwound from the feed-spool, and means on the housing engaged with the last-named mechanism for actuating the same to rotate said take-up spool for taking up unwound film as said carriages approach each other.

12. In a film camera, a pair of film spool carriages reciprocably movable in the housing thereof relatively to the latter and each other, one of said carriages adapted to contain a feed-spool and the other thereof a take-up spool, mechanism on the feed-spool carriage adapted to engage the feed-spool and to be actuated by rotation of the latter, brake-mechanism engaged with the first-named mechanism for resisting rotation of said feed-spool, mechanism on the take-up spool carriage adapted to engage the take-up spool to rotate the same in one direction, means for holding the said mechanism against rotation as said carriages are separated whereby to cause film to be unwound from the feed-spool, means on the housing engaged with the last-named mechanism for actuating the same to rotate said take-up spool for taking up unwound film as said carriages approach each other, and means on the feed-spool carriage adapted to be actuated by said means on said housing to lock the feed-spool engaging mechanism against rotation in the film-unwinding direction as said take-up spool carriage makes its initial approach toward the feed-spool carriage.

13. In a film camera, a feed-spool carriage and a take-up spool carriage reciprocably movable within the housing relatively to each other, mechanism on said carriages for effecting unwinding of film from the feed-spool carried by the feed-spool carriage and to wind the same upon the take-up spool of the other carriage as said carriages are separated and approach each other respectively, said mechanism including a ratchet-wheel on the feed-spool carriage, an oscillating lever carrying a dog adapted to engage said ratchet to hold said mechanism against rotation in a direction to unwind film from the feed-spool, and means engaged with said lever and actuated by the take-up spool carriage for actuating said lever to throw said dog into and out of engagement with said ratchet at predetermined intervals.

14. In a film camera, a feed-spool carriage and a take-up spool carriage reciprocably movable within the housing relatively to each other, mechanisms on said carriages for effecting unwinding of film from the feed-spool carried by the feed-spool carriage and to wind the same upon the take-up spool of the other carriages as said carriages are separated and approach each other respectively, said mechanisms including means on the feed-spool carriage for controlling the unwinding of film from the feed-spool carried thereby, and actuating devices for said means controlled by the relative movements of said carriages whereby to prevent unwinding of film at predetermined intervals.

15. In a film camera, a feed-spool carriage and a take-up spool carriage reciprocably movable within the housing relatively to each other, mechanisms on said carriages for effecting unwinding of film from the feed-spool carried by the feed-spool carriage and to wind the same upon the take-up spool of the other carriage as said carriages are separated and approach each other respectively, said mechanism including a lever, pawl and ratchet, mechanism adapted to prevent rotation in a direction to unwind film from the feed-spool and inter-engaging formations on said lever and said take-up spool carriage for actuating said lever to release said pawl from engagement with said ratchet as said carriages are separated.

16. In a film camera, a feed-spood carriage and a take-up spool carriage reciprocably movable within the housing relatively to each other, mechanisms on said carriages for effecting unwinding of film from the feed-spool carried by the feed-spool carriage as the carriages are separated from each other and to wind the same upon the take-up spool of the other carriage as said carriages approach each other, said mechanism including a lever, pawl and ratchet, adapted to prevent rotation in a direction to unwind film from the feed-spool and yieldably inter-engaging formations on said lever and said take-up spool carriage for actuating said lever to release said pawl from engagement with said ratchet as said carriages are separated.

17. In a film camera, a take-up spool carriage reciprocably movable in the housing, and equipped with mechanism for engaging a take-up spool to rotate the same, said mechanism adapted to be manually actuated to take up film when said carriage is disposed at one limit of its movement, a manually rotatable winding shaft reciprocably mounted in a wall of the housing and adapted when moved to the inner limit of its movement to engage said mechanism, a spring normally holding said shaft in said position, a key pivotally engaged with the outer end of said shaft, projections on said key adapted, when the latter is turned to one limit of its movement, to engage the wall of the housing to draw said shaft outwardly against the action of said spring, and stops on said shaft coacting with the wall of the housing for limiting the pivotal movement of said key to an arc of substantially ninety degrees.

18. In a film camera, a take-up spool actuating mechanism, and a manually operable shaft adapted to be thrown into and out of engagement therewith, said shaft rotatably and reciprocably mounted on a wall of the housing, a spring normally maintaining the same in engaging relation to said mechanism, a key pivotally mounted on the outer end of said shaft, stops on the latter for limiting the pivotal movement of said key thereon in one direction, and projections on said key adapted when the latter is turned to contact with the wall of the housing to engage said wall to draw said shaft out of engaging relation to said mechanism.

19. In a film camera, film spool carriages reciprocably mounted in the housing and separable for drawing a film area into the exposure plane, a pair of rock-shafts carrying film engaging members disposed parallel with the said exposure plane, oppositely disposed cranks at the ends of said shafts, a connecting rod for said cranks for simultaneously oscillating the same in opposite directions, a spring normally holding said shafts at one limit of their movement, a cam-member operatively connected with said connection rod for reciprocating the same against the action of said spring, and a projection on one of said carriages for engaging and actuating said cam-member to throw said film engaging members down over the edges of the film as said carriage approaches the outer limit of its movement.

20. In a film camera, film spool carriages reciprocably mounted in the housing and separable for drawing a film area into the exposure plane, a pair of rock-shafts carrying film-engaging members disposed parallel with the said exposure plane, oppositely disposed cranks at the ends of said shafts, a connecting rod for said cranks for simultaneously oscillating the same in opposite directions, a spring normally holding said shafts at one limit of their movement, a cam-member operatively connected with said connecting rod for reciprocating the same against the action of said spring, and a projection on one of said carriages for engaging and actuating said cam-member to throw said film engaging members down over the edges of the film as said carriage approaches the outer limit of its movement, a second projection on said carriage, and a projection on one of said shafts adapted to become disposed in the path of return movement of the second projection on said carriage as said film-engaging members are turned to engage the film edges, and adapted to be forced out of the path of said projections of said carriage as the latter moves rearwardly whereby to throw said film-engaging members out of the path of said carriage in the event that said spring shall fail.

21. In a film camera, film spool carriages reciprocably mounted in the housing and separable for drawing a film area into the exposure plane, a pair of rock-shafts carrying film engaging members disposed parallel with the said exposure plane, oppositely disposed cranks at the ends of said shafts, a connecting rod for said cranks for simultaneously oscillating the same in opposite directions, a spring normally holding said shafts at one limit of their movement, a cam-member operatively connected with said connecting rod for reciprocating the same against the action of said spring, and a projection on one of said carriages for engaging and actuating said cam-member to throw said film-engaging members down over the edges of the film as said carriage approaches the outer limit of its movement, and inter-engaging devices on said carriage and one of said shafts for turning the latter to throw said film-engaging members out of the path of said carriage during the return movement of the latter.

22. In a film camera, a loading door and a hinge connection between the same and a wall of the housing comprising a flat spring secured at one end to the inner face of the housing wall and provided at its other end with a projection, there being a free space between the intermediate portion of said spring and the wall of the housing, said door hinged to the outer ends of said projections and in the plane of said housing wall.

23. In a film camera, a loading door and a yielding hinge connection between the same and a wall of the housing whereby said hinge is capable of movement relatively to said wall transversely to the plane thereof, and stops disposed in the path of the door for determining the inner limit of its movement relatively to said wall, whereby when said door is closed, said hinge is prevented from moving inwardly relatively to the housing.

24. In a film camera, a pair of film-spool carriages reciprocably movable within the housing and relatively to each other and adapted to be separated to draw a film area into the exposure plane, a spacing bar for determining the relative positions of said carriages to each other and the exposure plane whereby to determine the maximum length of film to be drawn into said exposure plane, said bar adapted to be rotated to occupy either of several different carriage controlling positions, a digitally engageable member on one end of said spacing bar for rotating the same and bearing ordinals, a member having an opening positioned to render invisible all except one of said ordinals and adapted to expose one ordinal indicating the position of said spacing bar with respect to the length of film area adapted to be exposed, and means for yieldingly holding said spacing bar in its respective positions.

25. In a film camera, a rotatable spacing bar, a digitally engageable member for rotating the same and bearing an ordinal for each of its several positions, means engaged with said bar for yieldingly holding it in any one of several positions, a member associated with said digitally engageable member having an opening through which the several ordinals are successively visible as said spacing bar is rotated to indicate the length of film area adapted to be exposed for each of the several positions of said spacing bar, film spool carriages reciprocally movable within the housing and relatively to each other and adapted when separated to draw film into the exposure plane, and coacting means on said spacing bar and carriages for limiting the reciprocal movement of both carriages relatively to the housing and each other.

26. A film camera having film spool carriages reciprocably movable within the housing and relatively to each other and adapted when separated to draw film into the exposure plane, a spacing bar within the housing for controlling the reciprocal movements of said carriages in one direction relatively to the housing and to each other for determining the length of film drawn into the exposure plane during the relative separating movements of said carriages, and mechanism for recording the successive lengths of film exposed including a spring-held reciprocable member mounted on a wall of the housing, a trip-lever mounted on one of said carriages, and projections on said member disposed in the path of said trip-lever for actuating said bar against the action of its spring as said carriage moves in one direction.

27. A film camera having film spool containers, each comprising a substantially cylindrical housing, a hinged lid for each thereof, a latch member pivoted concentric with and upon each lid and having a projection extending longitudinally of the housing, a catch disposed in the path of said projection and adapted to engage in a recess in the latter, and a spring engaged with said latch member for holding the same normally in engaging relation to said catch.

28. A film camera having film spool containers, each comprising a substantially cylindrical housing, a hinged lid for each thereof, a latch member pivoted concentric with and upon each lid and having a projection extending longitudinally of the housing and provided with a recess, a catch disposed in the path of said projection and adapted to engage in said recess in the latter, and a spring engaged with said latch member for holding the same normally in engaging relation to said catch, the body of said latch member provided with a longitudinal groove opposing the lid, and said spring being housed in said groove.

WILLIAM A. PETERS.